(United States Patent Office — 2,976,473 — Patented Mar. 21, 1961)

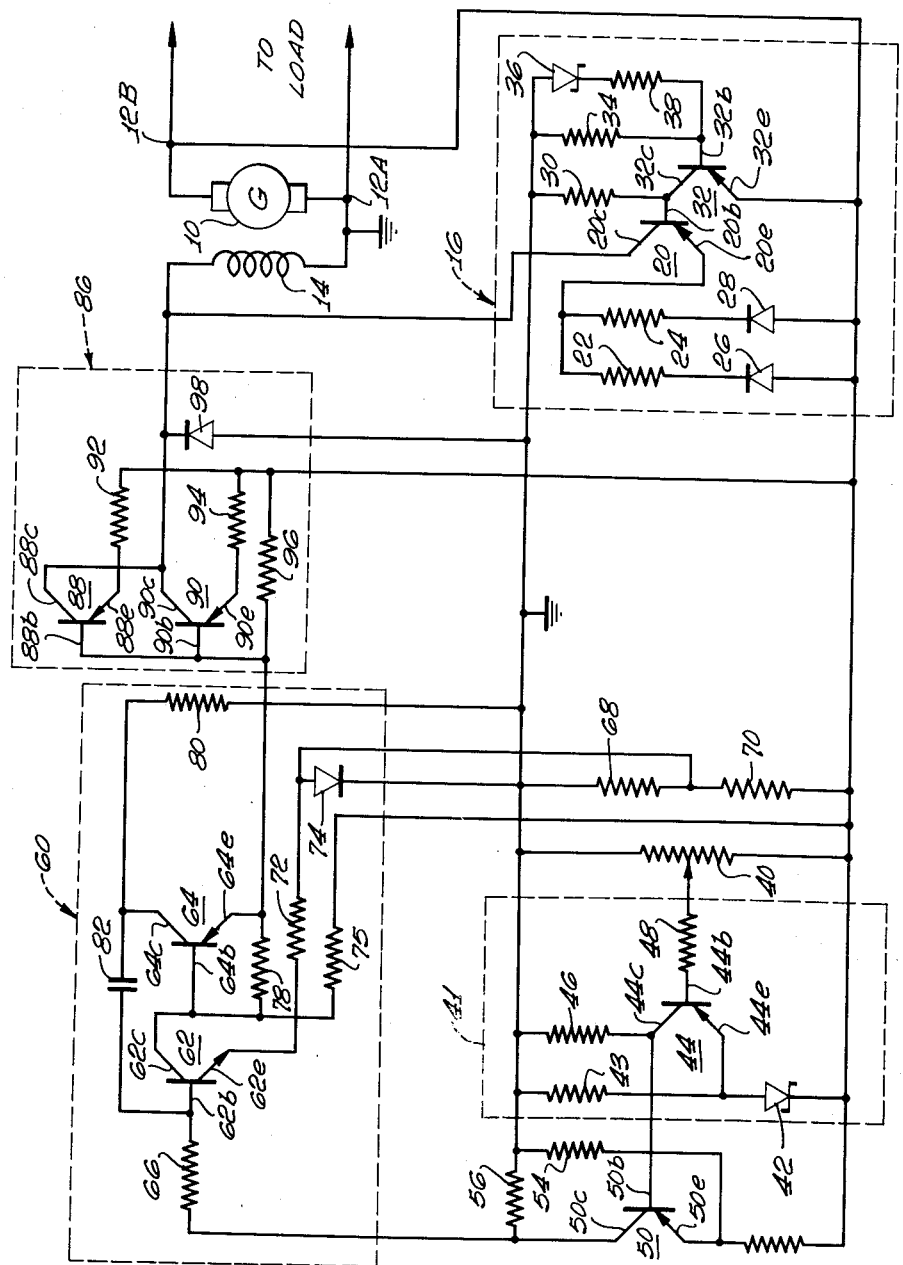

2,976,473
VOLTAGE REGULATOR FOR GENERATORS

Benjamin Chandler Shaw and Bernard M. Van Emden, Los Angeles, Calif., assignors to Crane Co., Burbank, Calif., a corporation of Illinois Filed June 17, 1959, Ser. No. 820,997

6 Claims. (Cl. 322—28)

This invention relates to voltage regulators and, more particularly, to an improved circuit for regulating the output voltage of a generator.

An object of the present invention is to provide a novel and improved voltage regulator for a generator.

Another object of the present invention is to provide a compact voltage regulator for shunt field generators.

Still a further object of the present invention is to provide a novel pulse-width modulated transistorized voltage regulator for shunt generators.

These and other objects of the invention are provided in an arrangement wherein the armature winding of the shunt generator is connected through a transistorized starting circuit to the shunt field of the generator. The transistorized starting circuit applies the output of the generator when it first is started up to the shunt field of the generator. Thereby the generator voltage will be built up to a predetermined point, at which time the transistorized switch is rendered nonconductive. The output of the generator is then compared with a reference voltage in a manner to provide a difference voltage. This difference voltage is employed to control a variable pulse-width oscillator in a manner to vary the width of the pulses in accordance with the difference voltage. The output of the variable pulse-width oscillator is applied to the shunt field of the generator. Since the excitation of the field varies with the width of the pulses applied thereto and the pulse width varies with the difference between the generator output and the reference voltage, there is provided a circuit for regulating the output voltage of the generator.

The novel features that are considered characteristic of this invention are set forth with particularity in the appended claims. The invention itself, both as to its organization and method of operation, as well as additional objects and advantages thereof, will best be understood from the following description when read in connection with the accompanying drawing, which is a circuit diagram of an embodiment of the invention.

Referring now to the drawing, there may be seen a circuit diagram of a voltage regulator for a shunt generator. The shunt generator includes an armature 10 having a pair of output terminals 12a, 12b, and a shunt field winding 14. The output terminals 12a, 12b are connected to the load and are also connected to the voltage regulator which is an embodiment of this invention. Terminal 12a is connected to ground, and one side of the field winding 14 is also connected to ground.

The armature terminals 12a, 12b are connected to the starting circuit 16, which is enclosed in the dotted rectangle. The starting circuit serves the function of connecting the armature directly to the field winding when the generator is first started up, in order to enable the generator output voltage to be built up. After the output voltage exceeds a predetermined value, the starting circuit opens the direct connection between the generator armature and the field.

The starting circuit includes a first transistor 20, which may be of the PNP type. The transistor has an emitter 20e, a collector 20c, and a base 20b. The emitter 20e is connected to the armature terminal 12b through parallel resistors 22, 24, connected in series with two diodes, respectively 26, 28. The collector 20c of transistor 20 is connected to the field winding 14. The base 20b is connected to ground through a resistor 30. The second transistor 32 which may also be of the PNP type has an emitter electrode 32e, a collector electrode 32c, and a base electrode 32b. The collector 32c is connected to the base 20b, the emitter 32e is connected to the generator terminal 12b, and the base 32b is connected to ground through a resistor 34. In parallel with resistor 34 is a Zener diode 36 in series with a resistor 38.

The property of the Zener diode is well-known. It has a high impedance when a reverse voltage below a certain value is applied thereacross. When the voltage exceeds this certain value, then the impedance becomes relatively low and a relatively large current can flow. Thereafter, the voltage drop across the diode remains constant, despite variations in the current flow. Zener diodes are readily purchasable and, as pointed out above, their characteristics are well-known in the electronic art.

When the generator is first started up, there is an output voltage across terminals 12a, 12b provided as a result of the residual magnetism in the field iron of the generator. This voltage is applied to the transistor 32, and, by reason of the positive voltage applied to its emitter, it will become conductive. A current flows through the resistor 30 to the collector 32c. This current, however, is too small to raise the potential of the base 20b of transistor 20 until transistor 20 is blocked. Thus, transistor 20 is conductive by reason of its connections to terminal 12b of the generator and through the field coil 14 to the terminal 12a of the generator. Effectively, transistor 20, while conductive, connects the field coil 14 across the output terminals of the armature.

Transistor 20 remains conductive until such time as the voltage across the output terminals of the generator exceeds a predetermined level. This predetermined level is determined by the characteristics of the Zener diode 36. The manufacturers provide a complete range of "breakdown" voltage values for the Zener diodes. Therefore, when the generator output voltage, as applied to the Zener diode 36 across the emitter and base of the transistor 32, exceeds the breakdown voltage of the Zener diode, the transistor 32 has its base effectively connected to ground and thereby is driven into saturation. Effectively, thereby, collector 32c is very close to the potential of the emitter 32e. This results in blocking transistor 20. Thus, it is rendered nonconductive, and, aside from a small leakage current, for all intents and purposes the field 14 is no longer connected to the armature terminal 12b through the starting switch.

The armature terminals 12a, 12b are also connected to a potentiometer 40, the purpose of which is to obtain a sample of the generator voltage. This generator sample voltage is compared with a reference voltage which is established by a circuit enclosed in the dotted rectangle 41. This reference voltage circuit includes a Zener diode 42 connected in series with a resistor 43. The series-connected Zener diode and resistor are connected across the terminals 12a, 12b. The property of the Zener diode which enables it to be used as a reference voltage device is that after breakdown has occurred, by reason of the application of a reverse voltage thereacross in excess of the breakdown value, the Zener diode will have a constant voltage drop thereacross, regardless of variations in current. Therefore, the junction of the connection between the resistor 43 and the Zener diode 42 is maintained at a stable reference voltage level.

The reference voltage is compared with the voltage derived from the generator output by a comparator circuit enclosed in the rectangle 41. This includes a PNP transistor 44, having an emitter 44e, collector 44c, and base 44b. The emitter 44e is connected to the reference voltage connection between the resistor 43 and Zener diode 42. The collector 44c is connected through a resistor 46 to terminal 12a or ground. The base 44b is connected to the potentiometer 40 through a resistor 48.

The voltage provided at the collector 44c will be the difference between the voltages provided by the Zener diode and the potentiometer. This occurs by reason of the fact that the current drawn through the collector 44c is determined by the difference in the voltages applied to the respective emitter and base of the transistor 44. This difference voltage is amplified by a PNP transistor 50. This transistor has its base 50b connected to the collector 44c of the transistor 44. The emitter 50e of the transistor 50 is biased in the conductive mode by being connected between the two voltage divider resistors 52, 54. These resistors are connected across the armature terminals 12a, 12b. A load resistor 56 is connected between the collector 50c of the transistor 50 and ground. The difference between the generator voltage sample and the stable reference voltage is proportional to any change in the generator output voltage. The magnitude of the generator output voltage can be determined by the position of the slider on the potentiometer 40.

The amplified difference voltage is applied to a variable pulse-width oscillator 60, the circuit for which is enclosed in the dotted rectangle. This oscillator is responsive to the amplitude of the difference signal being applied to its input control. When the direct-current level or amplitude of this input changes, it changes the "on" time to the "total" time ratio of the oscillator accordingly. For an increase in this level, the oscillator "on" time increases and essentially thereby increases the average field current. The reverse is true for decreases in the control voltage level. When the average field current increases, the generator output voltage increases. The difference voltage thereby is decreased. In this way, the generator output voltage may be controlled to minimize or null out the difference signal.

The variable pulse-width oscillator includes two transistors 62, 64. The base 62b of transistor 62 is connected through a resistor 66 to the collector 50c of the amplifier transistor 50. The transistor 62 is of the NPN type, and its emitter 62e is biased by being connected between two resistors 68, 70, which in turn are connected across the terminals 12a, 12b. The connection of the emitter 62e to the junction between the resistors 68, 70 is by way of a resistor 72. A clamping diode 74 is inserted to prevent the emitter 62e from becoming too positive. The collector 62e of the transistor 62 is connected to the base 64b of transistor 64. The collector 62c as well as the base 64b are connected through a resistor 75 to the positive terminal 12b of the armature of the generator. The transistor 64 is of the PNP type. Its emitter is connected to the collector 62c through a resistor 78. The collector 64c of transistor 64 is connected through a resistor 80 to ground. It is also connected back to the base 62b of the transistor 62 through a feedback capacitor 82.

The operation of the two-transistor variable pulse-width oscillator circuit is known. The pulse width of this oscillator is determined by the magnitude of the feedback capacitor 82 and the potential applied to the base 62b of the transistor 62. This potential, of course, is determined by the difference voltage obtained from the amplifier 50. Transistor 62 is rendered conductive by the difference voltage. Its collector draws current, thereby applying a negative-going signal to the base of transistor 64. Transistor 64 is thereby triggered into conduction, cutting off transistor 62. Capacitor 82 feeds back a pulse to the base 62b, which causes transistor 62 to become conductive again as soon as transistor 64 cuts itself off by reason of its base becoming more positive than its emitter.

The output of the variable pulse-width oscillator is applied from the emitter of transistor 64 to a power amplifier section which is enclosed in the dotted rectangle 86. This includes two transistors 88, 90, which are connected in parallel in order to produce sufficient amplification of the pulses being applied from the variable pulse-width oscillator. These transistors 88 and 90 respectively have their emitters 88e, 90e connected through resistors 92, 94 and through a resistor 96 to the emitter of transistor 64. Transistor 64, it should be noted, is connected as an emitter follower. The collectors 88c, 90c of the respective transistors are connected together and thereafter to the field 14 of the generator 10. The respective bases 88b, 90b are connected together and to the emitter 64e of the transistor 64. The emitters 88e, 90e are connected to the positive terminal 12b of the generator. The purpose of the transistors 88, 90, as indicated, is to amplify the pulses until a sufficient driving current is obtained for the field.

Since the power amplifier transistors are operated in a switching mode, their power dissipations are relatively low. Resistors 92 and 94 assure that the driving current is equally distributed between the two transistors. Resistor 96 assures that the leakage current of the collective junctions of the two transistors are not multiplied by the action of the transistor. A diode 98 is connected between the collectors of the transistors and ground in order to suppress any inductive spike which might be produced by the field inductance which otherwise might injure the two transistors.

There has been accordingly described and shown herein a novel and useful voltage regulator for a generator which is a completely transistorized package and therefore can be constructed in a minimum of space. The circuit is novel, and the operation thereof provides excellent voltage regulation.

We claim:

1. A voltage regulator for a generator having an armature and a field winding comprising a transistor switch connected between said armature and field winding, means for biasing said transistor switch to be conductive when said armature produces an output voltage below a predetermined level and for biasing said transistor switch to be nonconductive when said armature output voltage exceeds said predetermined level, means for establishing a reference voltage, means for comparing said armature output voltage with said reference voltage to establish a difference voltage, a variable pulse-width oscillator, means for controlling the pulse-width output of said variable pulse-width oscillator responsive to said difference voltage, and means for applying the output of said variable pulse-width oscillator to said field winding to regulate said generator armature output voltage thereby.

2. A voltage regulator as recited in claim 1 wherein said transistor switch comprises a transistor having an emitter, collector, and base electrode, a rectifier, a resistor having one end connected to said rectifier, means connecting the other end of said resistor to one of said emitter and collector electrodes, means connecting said rectifier to said armature, means connecting the other of said emitter and collector electrodes to said field winding, and means connecting said base electrode to said means for biasing.

3. A voltage regulator as recited in claim 1 wherein said means for biasing said transistor switch to be conductive when said armature produces an output voltage below a predetermined level and for biasing said transistor switch to be nonconductive when said armature output voltage exceeds a predetermined level includes a transistor having base, emitter, and collector electrodes, means connecting said collector and emitter electrodes to said generator armature, means connecting said collector electrode to said transistor switch, a first resistor connected between said base electrode and said armature, regulating means having a relatively high impedance when voltages applied thereto are below a predetermined value and a relatively low impedance when voltages applied thereto exceed said predetermined value, and means connecting said regulating means in parallel with said first resistor.

4. A voltage regulator as recited in claim 1 wherein said means for establishing a reference voltage includes a first resistor, a Zener diode connected in series with said first resistor, and means connecting said series-connected Zener diode and first resistor across said generator armature, and said means for comparing said armature output voltage with said reference voltage to establish a difference voltage includes a transistor having emitter, collector, and base electrodes, means for applying voltage from said armature to said base electrode, a second resistor connecting said collector electrode to said first resistor, and means connecting said emitter electrode to the connection between said Zener diode and said first resistor.

5. A voltage regulator for a generator having an armature with a pair of output terminals, and a shunt field winding comprising a starting circuit including a first transistor having an emitter, collector, and base electrode, a rectifier, a first resistor connected in series with said rectifier, means connecting said series-connected first resistor and rectifier between said first transistor-emitter electrode and one of said pair of armature output terminals, means connecting said first transistor-collector electrode to said field winding, a second transistor having emitter, collector, and base electrodes, means connecting said second transistor-collector to said first transistor base, a second resistor connecting said second transistor-collector to the other of said pair of armature output terminals, means connecting said second transistor emitter to said one of said pair of armature output terminals, a third resistor connecting said second transistor base to said other of said pair of armature terminals, a first Zener diode, and means connecting said Zener diode in parallel with said third resistor, a fourth resistor, a second Zener diode connected in series with said fourth resistor, means connecting said series-connected fourth resistor and second Zener diode between said armature pair of output terminals, a third transistor having emitter, collector, and base electrodes, means connecting said third transistor emitter to the connection between said second Zener diode and said fourth resistor, a fifth resistor connecting said third transistor collector to said other of said pair of armature terminals, potentiometric means connected to said pair of armature output terminals, means coupling said potentiometric means to said third transistor base, a variable pulse-width oscillator having a control input and an output, means coupling said third transistor collector to said control input, and means coupling said variable pulse-width oscillator output to said shunt field winding.

6. A starting circuit for a generator having a shunt field winding and an armature with a pair of output terminals comprising a first transistor having an emitter, collector, and base electrode, a rectifier, a first resistor connected in series with said rectifier, means connecting said series-connected first resistor and rectifier between said first transistor-emitter electrode and one of said pair of armature output terminals, means connecting said first transistor-collector electrode to said shunt field winding, a second transistor having emitter, collector, and base electrodes, means connecting said second transistor collector to said first transistor base, a second resistor connecting said second transistor collector to the other of said pair of armature output terminals, means connecting said second transistor emitter to said one of said pair of armature output terminals, a third resistor connecting said second transistor base to said other of said pair of armature terminals, a first Zener diode, and means connecting said Zener diode in parallel with said third resistor.

No references cited.